Nov. 18, 1930.  I. D. FORD  1,782,164
SECURING MEANS
Filed June 11, 1928

Inventor
Ira D. Ford

By Emery, Booth, Janney & Varney Attys

Patented Nov. 18, 1930

1,782,164

UNITED STATES PATENT OFFICE

IRA D. FORD, OF ROSELAND, ONTARIO, CANADA, ASSIGNOR TO UNIVERSAL BUTTON FASTENING & BUTTON COMPANY, OF DETROIT, MICHIGAN, A CORPORATION OF MICHIGAN

SECURING MEANS

Application filed June 11, 1928. Serial No. 284,313.

This invention relates to snap fastener securing means and aims to provide an improved snap fastener means for detachably securing pieces of cloth together.

The invention may be readily understood by reference to one illustrative embodiment thereof shown in the accompanying drawing.

Figure 1:
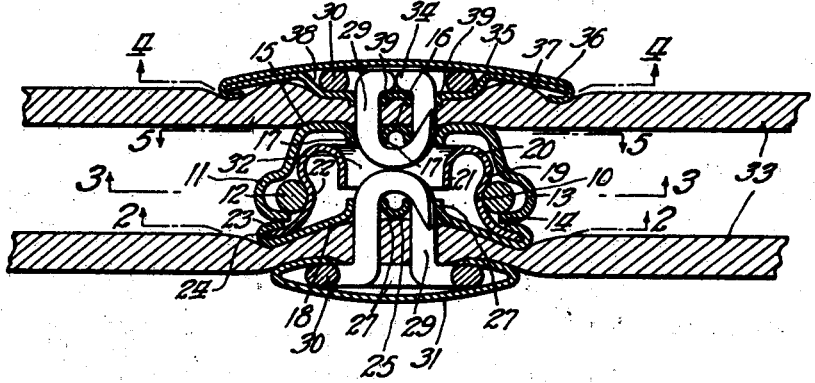
Fig. 1 is an enlarged section through the elements of a closed snap fastener secured to overlapping pieces of fabric.
Figure 2:
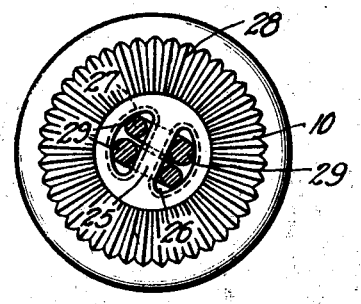
Fig. 2 is a bottom plan view of the stud element of the fastener taken along the line 2—2 of Fig. 1.
Figure 3:
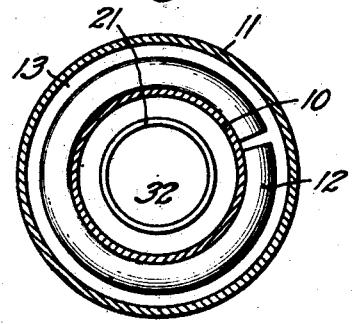
Fig. 3 is a plan section through the closed fastener elements taken along the line 3—3 of Fig. 1.
Figure 4:
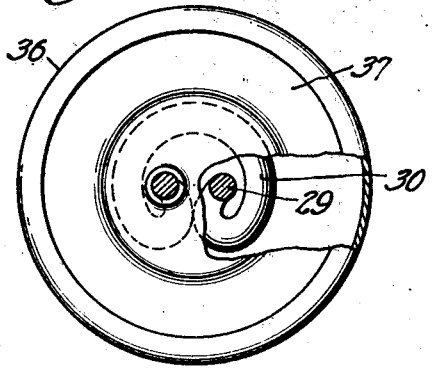
Fig. 4 is a bottom plan view of the upper fastener head taken along the line 4—4 of Fig. 1, certain parts having been broken away to improve illustration.
Figure 5:
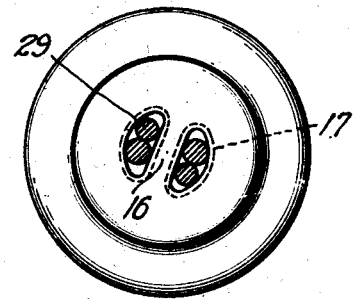
Fig. 5 is a plan view of the base of the socket element of the snap fastener taken along the line 5—5 of Fig. 1.

Because of the facility of their application and because they eliminate the need for expensive button holes, snap fasteners are advantageous for fastening together overlapped pieces of cloth or the like, particularly in working clothing and other articles where ease in fastening or unfastening is important or where fastening by buttons or hooks is unsuitable or expensive. However, the strain which is placed on the cloth to separate the snap fastener elements (which have adequate separation resistance for articles of clothing of this character) frequently results in tearing of the cloth at the points of attachment, due to weaknesses created by severing of the threads by the attaching means and to inadequate gripping of the cloth by the attaching elements. Snap fasteners have, therefore, been objectionable notwithstanding their inherent advantages, except for unusually strong materials, such as leather.

The illustrative snap fastener is herein represented by inter-fitting stud and socket elements 10 and 11 which may be separably held together through the action of a resilient element in the form of a spring ring 12 carried by the socket element. The latter element consists of a cup-shaped member advantageously pressed from sheet metal and having an interior groove 13 adjacent the rim 14 of the cup in which is loosely held the spring ring 12, which in this instance extends almost, but not quite, around the circumference of the groove. The base 15 of the socket is formed to present a substantial fabric engaging surface and is pierced to provide a pair of spaced openings separated by an intervening attaching bar 16. In forming these openings the metal is not punched free of the fastener base but is curled up inside the cup around the edges of the opening, as at 17, to stiffen the base of the socket and to reinforce and stiffen the bar. This method of forming the bar 16 obviates the necessity for clearing the socket elements of small pieces of scraps of metal which would be present had the openings in the base been formed by a true punching operation.

The stud element 10 comprises in this instance a circular base 18 likewise presenting a substantial fabric engaging surface, and a projecting stud 19 of less diameter than the base. The head 20 of the stud is rounded in this instance by beading or curling inwardly the free edge 21 of the metal, and formed to an external diameter slightly greater than the diameter of the spring ring 12. The depth of the stud is sufficient to permit the head thereof to pass the spring ring of the socket element into which it is snapped, the spring ring fitting underneath the head around the reduced neck 22 of the stud. The groove 13 in the socket is made sufficiently larger than the normal diameter of the ring to allow room for necessary expansion of the ring in passing over the larger stud head.

The spring strength of the spring ring 12 and shape and diameter of the stud head 20 and neck 22 are designed to cause the snap fastener parts to offer appropriate resistance to separation. Where the fastener is designed to hold together portions of a cloth garment, for example, the resistance to separation of the stud and socket must be at least great enough to withstand the tension (which is sometimes relatively large) exerted in the normal use of the garment.

The base 18 of the stud element is advantageously formed in a separate piece and attached to the stud proper by crimping its flange 23 over the projecting flange 24 at the base of the stud. A bar 25 is formed in the stud base, as in the socket base, by piercing the spaced openings 26 by tools which curl up the metal around the margins of the holes, thus providing the bar with up-standing marginal flanges 27 which substantially reinforce it. The base of the stud is reinforced in this instance by a series of radial corrugations 28 covering substantially the surface and base and serving to prevent distortion of the base (and possible loosening of the fastener element) by the attaching forces. The base is further reinforced to sustain the attaching forces by being arched upwardly to cooperate with the radial corrugations therein to transmit the gripping forces from the center of the base outwardly to its rim.

The attaching means comprises in this instance a headed and double pronged fastener whose pointed prongs 29 pierce the fabric at separated points without weakening any part thereof. The fastener is in this case made of wire bent intermediate its ends into a sort of C-shape to provide a base 30 finished by a cap 31 whose margins are crimped under and grip the base and whose diameter is such as to provide a head of substantial size, relative to that of the snap fastener base, to present a substantial surface for gripping the fabric. After piercing the fabric the prongs are curled around the snap fastener bar by an upsetting tool or die which enters the central portion 32 of the snap fastener element, and made to grip the bar tightly by the compression exerted by the upsetting tools. The tension thus created in the fastener prongs by the attaching operation is sufficient to cause the bases of stud and socket elements and the cooperating attaching fastener heads tightly to grip and compress the fabric between them. In the drawing the pieces of fabric 33 are shown thus compressed; but the degree of compression necessary to effect an efficient grip obviously depends somewhat on the character and thickness of the fabric or layers of fabric to which the snap fastener element is secured. This grip is augmented by the corrugations in the fastener element base and should be firm enough to contribute substantially to securing the fastener element in place and should be adequate to withstand the usual pull upon the cloth (which with some snap fasteners may be relatively strong) necessary to separate the fastener elements, so that in the ordinary case the tendency to displace or shift the fabric between the gripping head and base is effectively resisted. In this connection it should be noted that both the socket and stud elements are designed so that their respective central portions 32 are open and accessible to an upsetting tool.

For purposes of decoration or advertisement the outer or top fastener 34 is advantageously provided with a head 35 larger than that necessary merely for purposes of attachment. In this instance the finishing cap 36 is crimped around a disc 37 pierced by the fastener prongs and having a central recess 38 into which the base 30 of the prongs is pressed. The fastener prongs either entirely pierce or partially enlarge already formed openings in the disc so that the disc will grip the prongs tightly, as indicated at 39, and thereby seal the interior of the fastener head against the entrance of corrosive laundry fluids.

The piercing of the fabric by the attaching prongs 29 not only preserves the integrity of the fabric but avoids any wrinkling thereof, leaving a smooth surface to be gripped. Since its integrity is preserved, the fabric cannot readily slip between the gripping heads; and the prongs themselves resist any tendency to slip. It is, therefore, difficult, if not impossible, for the fabric to be slit in separating the snap fastener elements. Such fabric tension as may actually reach the prongs is divided among two prongs, thereby further insuring against the development of any slitting stresses.

The qualities above pointed out make available the use of the snap fastener principle in those forms of clothing in which it is particularly advantageous, such as children's rompers and working-men's clothing. I have found that through the elimination of expensive button holes, four garment handlings may be eliminated in the course of manufacture. This is a very important item in the cost of manufacture because clothing is of a character which makes it particularly difficult and expensive to handle in passing it through the various manufacturing operations.

In addition to the direct benefits to the garment manufacturer, the advantages in use of the improved snap fastener are substantial. I have discovered that the combined securing action of spaced piercing prongs and the clamping or gripping action above referred to provide a very great factor of safety in firmness and durability of attachment, particularly as compared to the force necessary to separate the fastener elements. The firmness and security of fastening enables one to derive full benefit of the fastening characteristics of the snap fastener. They may not only be quickly and easily snapped together (by one hand if necessary) but by a single pull applied at an appropriate portion of the garment an entire line of fasteners may be separated, with the assurance that the cloth will not be weakened or torn and that the fasteners will remain securely attached during the useful life of the garment.

Obviously the invention is not limited to the details of the illustrative construction, since these may be variously modified. Moreover, it is not indispensable that all features of the invention be used conjointly, since various features may be used in different combinations and sub-combinations.

Having described one embodiment of my invention, I claim:

1. A snap fastener structure comprising in combination a snap fastener element having a cloth engaging base pierced to provide spaced openings and an intervening attaching bar, the metal displaced to provide said openings being curled inwardly to provide up-standing marginal flanges for said bar, said base being corrugated to reinforce the same, and an attaching fastener having a head and spaced pointed prongs, said head and base being of a size to present substantial cloth engaging faces, said prongs piercing the cloth without severing any part thereof and being bent around the attaching bar under pressure to cause said head and base tightly to grip opposite sides of the cloth.

2. A snap fastener structure comprising in combination a snap fastener element having a cloth engaging base pierced to provide spaced openings and an intervening attaching bar, the metal displaced to provide said openings being curled inwardly to provide up-standing marginal flanges for said bar, said base being formed with a series of radial corrugations to reinforce the same, and an attaching fastener having a head and spaced pointed prongs, said head and base being of a size to present substantial cloth engaging faces, said prongs piercing the cloth without severing any part thereof and being bent around the attaching bar under pressure to cause said head and base tightly to grip opposite sides of the cloth.

3. A snap fastener structure comprising in combination a snap fastener element having a cloth engaging base pierced to provide an attaching opening, the metal displaced thereby being curled inwardly to provide a stiffening flange, said base being provided with radial corrugations to reinforce the same, and a headed and pointed prong attaching fastener piercing the fabric without severing any part thereof and being upset under tension inside the snap fastener element, the fastener head and said base being of a size to present substantial cloth engaging faces and tightly gripping the cloth on opposite sides thereof to hold the snap fastener element in place.

4. A snap fastener structure comprising in combination a snap fastener element having a cloth engaging base pierced to provide an attaching opening, the metal displaced thereby being curled inwardly to provide a stiffening flange, said base being arched inwardly and provided with radial corrugations to reinforce the same, and a headed and pointed prong attaching fastener piercing the fabric without severing any part thereof and being upset under tension inside the snap fastener element, the fastener head and said base being of a size to present substantial cloth engaging faces and tightly gripping the cloth on opposite sides thereof to hold the snap fastener element in place.

5. A snap fastener structure comprising in combination a snap fastener element having a cloth engaging base pierced to provide an attaching opening, the metal displaced thereby being curled inwardly to provide a stiffening flange, said element consisting of a stud part having a marginal bottom flange and a base part having a marginal flange, said flanges being crimped together to unite said parts, said base being arched inwardly and provided with radial corrugations to reinforce the same, and a headed and pointed prong attaching fastener piercing the fabric without severing any part thereof and being upset under tension inside the snap fastener element, the fastener head and said base being of a size to present substantial cloth engaging faces and tightly gripping the cloth on opposite sides thereof to hold the snap fastener element in place.

6. A snap fastener structure comprising in combination a snap fastener element having a cloth engaging base pierced to provide an attaching opening, the metal displaced to provide said opening being curled inwardly to provide an up-standing marginal flange around said opening, said base being provided with a series of radial corrugations to reinforce the same, and an attaching fastener having a head and pointed prong, said head and base being of a size to present substantial cloth engaging faces, said prong piercing the cloth without severing any part thereof and being upset under pressure inside said element so as to engage the edge of said opening and causing said head and base tightly to grip opposite sides of the cloth.

7. In combination, snap fastener elements having cooperating interengaging parts, one of said parts having a cloth engaging base portion provided with an opening, means for reinforcing said base including ribs pressed from said base and extending outwardly from the opening aforesaid, and a cap member cooperating with said base portion to clamp the cloth therebetween and having a portion projecting through the cloth and opening in said base portion for rigidly holding the parts in assembled position upon the cloth.

8. A snap fastener structure including two spaced cloth engaging members, one being a base and the other a cap, said base having a marginal open return bent flange, attaching means for said members including a headed and double pronged fastener formed entirely of wire and having the head thereof secured to and concealed by said cap and having the prongs thereof extending through and secured to said base, and a headed and flanged stud element having the flange thereof received in and held by the open return bent flange of said base and having the head thereof centered with respect to the prongs aforesaid.

9. A snap fastener structure including two spaced cloth engaging members of substantially uniform area for engagement with opposite sides of a piece of cloth, one being a base and the other a cap, attaching means between said base and cap including a headed and double pronged fastener formed entirely of wire and having the head thereof in the form of a split ring concentric with the prongs thereof and secured to the cap and having the prongs thereof extending through and secured to the base, and a headed and flanged stud element of sheet metal having the flange thereof secured to the base, the head thereof being tubular in form and provided at the center thereof with an inwardly extending marginal stiffening flange centered with respect to and surrounding the prongs aforesaid.

In testimony whereof, I have signed my name to this specification.

IRA D. FORD.